United States Patent
Cunningham et al.

(10) Patent No.: US 8,445,091 B2
(45) Date of Patent: May 21, 2013

(54) DUAL METAL OPTICAL DISCS

(75) Inventors: Justin John Cunningham, Camarillo, CA (US); Ibsen Lourenco, Ventura, CA (US); Holger Hofmann, Thousand Oaks, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 297 days.

(21) Appl. No.: 12/733,246

(22) PCT Filed: Aug. 20, 2008

(86) PCT No.: PCT/US2008/009886
§ 371 (c)(1),
(2), (4) Date: Mar. 23, 2010

(87) PCT Pub. No.: WO2009/025804
PCT Pub. Date: Feb. 26, 2009

(65) Prior Publication Data
US 2010/0183895 A1    Jul. 22, 2010

Related U.S. Application Data

(60) Provisional application No. 60/965,723, filed on Aug. 22, 2007.

(51) Int. Cl.
*B32B 3/02* (2006.01)
(52) U.S. Cl.
USPC ............... 428/64.1; 428/64.4; 430/270.11
(58) Field of Classification Search
USPC ............................................... 428/64.4
See application file for complete search history.

(56) References Cited

U.S. PATENT DOCUMENTS

| | | | |
|---|---|---|---|
| 6,007,889 A | 12/1999 | Nee | |
| 6,117,284 A | 9/2000 | Mueller | |
| 6,351,446 B1 | 2/2002 | Weinzerl et al. | |
| 6,645,352 B2 | 11/2003 | Weinzerl et al. | |
| 6,890,704 B2 | 5/2005 | Edwards | |
| 7,269,123 B2 | 9/2007 | Abraham et al. | |
| 7,316,837 B2 | 1/2008 | Nee | |
| 7,758,944 B1 * | 7/2010 | Fan et al. | 428/64.4 |
| 2002/0054973 A1 | 5/2002 | Weinzerd et al. | |
| 2005/0002308 A1 | 1/2005 | Tanaka | |
| 2005/0276211 A1 | 12/2005 | Hirotsune et al. | |
| 2006/0087956 A1 | 4/2006 | Carson et al. | |
| 2006/0110570 A1 | 5/2006 | Yeh et al. | |

FOREIGN PATENT DOCUMENTS

| | | |
|---|---|---|
| EP | 1162613 | 12/2001 |
| EP | 1653454 | 5/2006 |
| WO | WO0021079 | 4/2000 |

OTHER PUBLICATIONS

Search Report Dated Oct. 16, 2008.
Singulus, "Targets and Masks for Metallizer", May 2006.
Wikipedia: "Flexplay" retrieved from http://en.wikipedia.Or/wiki/Flexplay Feb. 18, 2009.

* cited by examiner

*Primary Examiner* — Elizabeth Mulvaney
(74) *Attorney, Agent, or Firm* — Robert D. Shedd; Robert B. Levy; Wan Yee Cheung

(57) ABSTRACT

An optical disc having at least two metal-containing layers with different compositions and partially overlapping areal extents in the plane of the disc and method of forming the disc are described. The optical disc with dual metallization exhibits visually distinct regions suitable for use for identification purposes.

20 Claims, 5 Drawing Sheets

US 8,445,091 B2

DUAL METAL OPTICAL DISCS

CROSS-REFERENCES TO OTHER APPLICATIONS

This application claims the benefit, under 35 U.S.C. §365 of International Application PCT/US2008/009886, filed Aug. 20, 2008 which was published in accordance with PCT Article 21(2) on Feb. 26, 2009 in English and which claims the benefit of U.S. provisional patent application No. 60/965,723, filed Aug. 22, 2007.

TECHNICAL FIELD

This invention relates to optical discs with dual metallization, and method of making the discs.

BACKGROUND

Present day manufacturing of an optical disc such as a DVD (sometimes referred to as a digital versatile disc or a digital video disc) begins with the creation of a glass master, which includes providing a layer of photoresist on a piece of ground, optically polished glass. A laser selectively exposes the photoresist to create a pattern of pits and lands, corresponding to a pattern of binary "ones" and "zeros" representing the digital information carried by the finished DVD. The exposed pattern of photoresist is developed to yield a pit and land structure of photoresist on the glass master.

The glass master undergoes a series of copy transformations (negative to positive to negative) to yield one or more stampers bearing the pit and land structure. The stamper is used during an injection molding process to create a polycarbonate layer or substrate having a topography that mirrors that of the stamper. The patterned polycarbonate layer undergoes metallization, which provides a reflective layer for use in reading the data. In the case of a single-sided, single layer disc, the metalized polycarbonate layer is bonded to a blank layer or substrate, e.g., as a protective layer, to yield the final disc, such as a DVD-5.

In the case of dual layer DVDs, each of the two data layers (referred to as a L0 layer and L1 layer, respectively) has an associated metal-containing layer for reflecting a laser beam used for reading the data. The first metal-containing layer associated with the first data layer is partially reflective, which allows a portion of a laser beam to pass through for accessing the data on the second data layer. The second metal-containing layer associated with the second data layer is usually totally reflective.

BRIEF SUMMARY OF THE INVENTION

Embodiments of the present invention relate to optical discs that have a visual appearance different from those of conventional discs.

One embodiment provides an optical disc that includes a first metal-containing layer and a second metal-containing layer, in which the two layers have different compositions and partially overlapping areal extents in a plane of the disc.

Another embodiment provides a method of forming such a disc. The method includes forming a first metal-containing layer on a portion of a first substrate, forming a second metal-containing layer over the first metal-containing layer, in which the two layers are provided with different compositions and partially overlapping areal extents in a plane of the first substrate.

BRIEF DESCRIPTION OF THE DRAWING

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

One aspect of the present invention relates to optical discs with different compositions, e.g., different metals or alloys in two metal-containing layers, in combination with partially overlapping areal extents of the metal-containing layers, to create a visual appearance that is different from those of conventional discs. Another aspect of the invention relates to methods of making such optical discs. The visual appearance can serve as a special "marking" of the discs so that they will be difficult to reproduce by low end replicators seeking to counterfeit legitimate optical discs.

Figure 1:
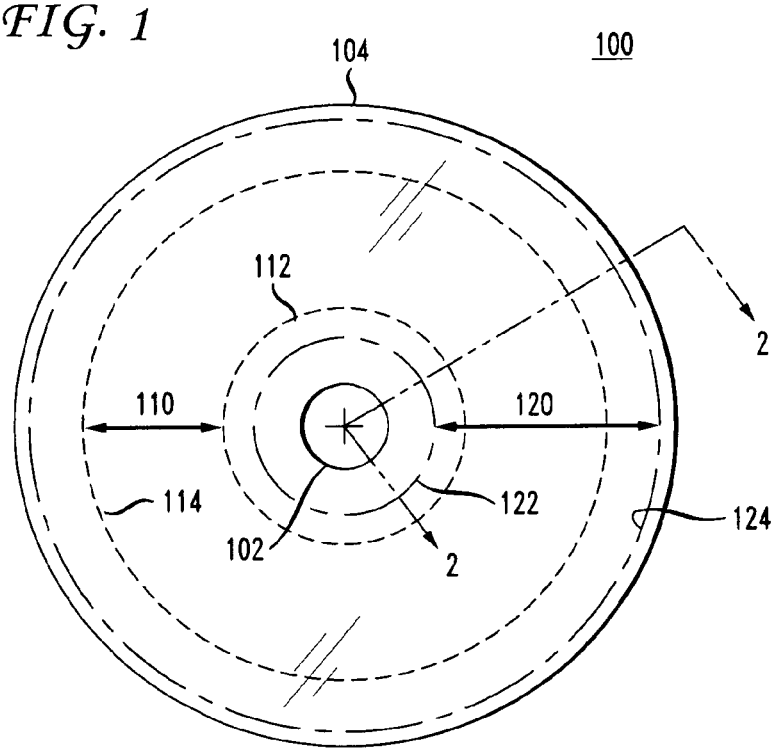
FIG. 1 depicts a plan view of an optical disc in accordance with one embodiment of the present principles.

FIG. 1 depicts a plan view of an optical disc 100 in accordance with the present principles. More particularly, FIG. 1 shows the plan view of the optical disc 100 defined by an inner perimeter 102 and an outer perimeter 104. Disc 100 is further characterized by two regions 110 and 120, each associated with a different metal-containing layer formed on the disc. Region 110 is defined between inner boundary 112 and outer boundary 114, and region 120 is defined between inner boundary 122 and outer boundary 124. Each inner and outer boundary can be defined by a corresponding radial distance measured from the center (indicated by "X") of the disc 100. The radial distance may also referred to as a "radius" in subsequent discussions. The two regions 110 and 120 have areal extents in the plane of disc 100 that partially overlap with each other.

In the example of FIG. 1, region 110 has an areal extent in the plane of disc 100 that is smaller than, and encompassed within, the areal extent of region 120.

Figure 2:
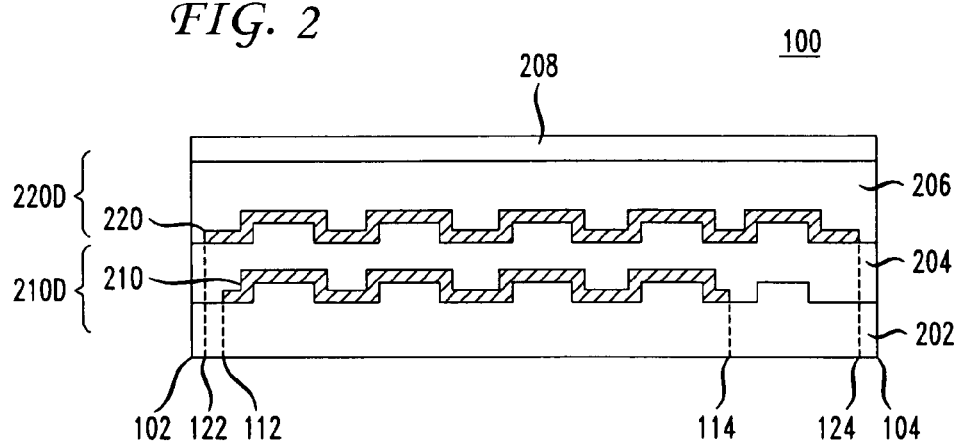
FIG. 2 depicts a cross-sectional view of the disc of FIG. 1.

FIG. 2 depicts a cross-sectional view of one embodiment of disc 100 taken along a line 2-2 showing various layers of the disc 100. Disc 100 includes a first substrate 202 with associated structure bonded to a second substrate 206 with associated structure via a bonding layer 204. First and second substrates 202, 206 and the bonding layer 204 may include a variety of non-metallic materials suitable for making optical discs. For example, first and second substrates may be made of an optically transparent (e.g., at least transparent at the wavelength of a data reading beam) material such as polycarbonate, while bonding layer 204 may be a resin.

Disc 100 has two data layers 210D and 220D: data layer 210D includes metal-containing layer 210 and corresponding data represented by pits and lands formed on substrate 202, and data layer 220D includes metal-containing layer 220 and corresponding data represented by pits and lands formed on substrate 206. Data layers 210D, 220D may be considered as similar to L0 and L1 layers, as typically used in relation to double-layer DVDs. Also shown in FIG. 2 are the relative positions of boundaries 102 and 104 defining disc 100, boundaries 112 and 114 defining region 110 that includes the metal-containing layer 210, and boundaries 122 and 124 defining region 120 that includes the metal-containing layer 220.

Metal-containing layers 210 and 220 have different compositions, and each includes a suitable metal or alloy, e.g., one of copper, aluminum, silver, gold, silicon, nickel, vanadium, copper-aluminum alloy, silver-based alloy, among others. Metal-containing layers 210 and 220 have compositions and thicknesses such that at least sufficient light is reflected from the layers for a pick-up head (PUH) to read the data in the respective layers. In one embodiment, both layers 210 and 220 are substantially totally reflective at one or more incident light wavelengths suitable for reading the data. In another embodiment, each layer is configured such that the amount of reflected light at the pick-up head conforms to industry standards to allow data on both layers of the disc to be read with existing disc players. In one example, the substrates and various layers in the disc 100 are configured such that between about 45% to about 85% of the incident light are reflected back to the pick-up head, which may operate, for example, at about 650 nm.

The metal-containing layer 210, which is provided over only a portion of the substrate 202, can be formed by providing a mask over substrate 202 prior to sputtering a suitable metal or alloy. For example, such a mask or mask set can cover the surface of substrate 202 between a radius from inner perimeter 102 to inner boundary 112, and between a radius from outer boundary 114 to the outer perimeter 104. This masking step may be referred to as "reduced radius masking". Metal-containing layer 220 may be formed by sputtering another metal or alloy onto substrate 206, and can be done with or without reduced radius masking, as appropriate. A protective or decorative layer 208, if desired, can then be formed over the entire upper surface of the structure to complete the formation of the disc.

Figure 3A:
FIGS. 3A-D depict cross-sectional views of a substrate structure during various stages of a disc fabrication process.

FIGS. 3A-D show cross-sectional views of a substrate structure during various stages of fabricating a disc according to one embodiment of the present invention. FIG. 3A shows a cross-sectional view of a substrate 302 from its inner perimeter 301 to its outer perimeter 303. Substrate 302 is generally made of any suitable materials, e.g., transparent material such as polycarbonate, with pits and lands (representing data) formed thereon using known techniques such as injection molding and stamping.

Figure 3B:
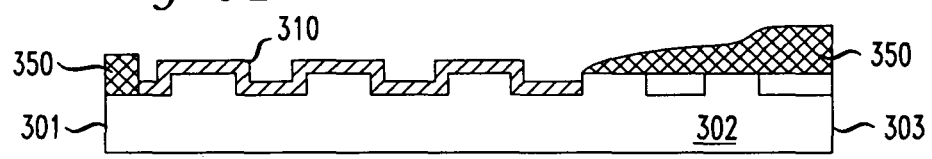

FIG. 3B shows a mask 350 placed over a portion of the substrate 302, and a metal-containing layer 310 formed over the unmasked portion of substrate 302. In one embodiment, the metal-containing layer 310 is formed by sputtering with a suitable metal-containing target, and the mask 350 is an annular metal plate designed for use in a sputtering equipment. The metal-containing target may be used to deposit one of copper, aluminum, silver, gold, silicon, nickel, vanadium, copper-aluminum alloy, silver-based alloy, among others. Suitable targets may be obtained from various commercial sources, including, for example, Singulus Technologies Inc. of Germany.

Figure 3C:
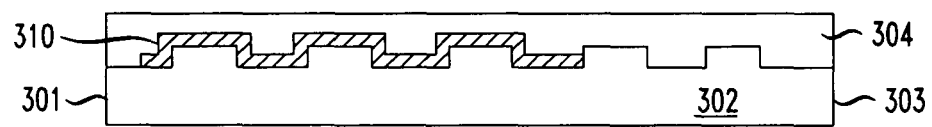

After removing the mask 350, a bonding layer 304 is formed over the structure that includes the substrate 302 and the metal-containing layer 310, as shown in FIG. 3C. The bonding layer 304 may be selected from a number of materials, including curable resins that are known to one skilled in the art.

Figure 3D:
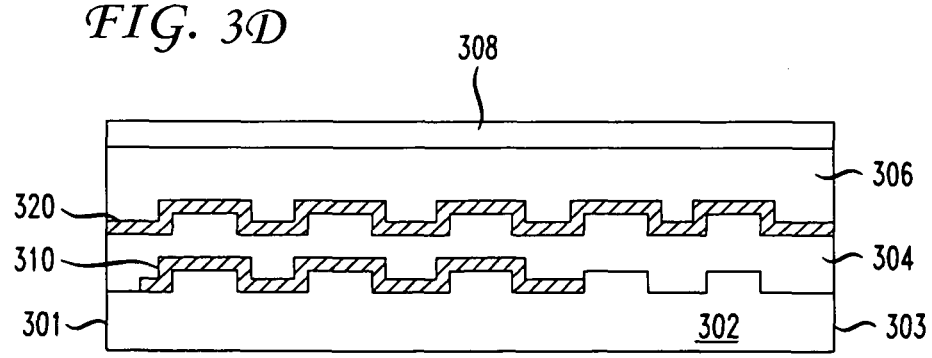

FIG. 3D shows the bonding layer 304 being used for bonding the substrate 302 and the first metal-containing layer 310 to a second metal-containing layer 320 that has been formed on a second substrate 306. The second substrate 306, which also includes pits and lands representing data, is formed by stamping and the metal-containing layer 320 is formed by sputtering.

The second metal-containing layer 320 has a composition that is different from that of metal-containing layer 310. As shown in FIG. 3D, the areal extents of metal-containing layers 310 and 320 in the plane of the disc structure only partially overlap with each other. Optionally, a protective or decorative layer 308, e.g., lacquer or print, can be formed over the second substrate 306.

In one embodiment, duplicate data is recorded in the first and second substrates 302 and 306. To ensure that data on both layers can be read properly by conventional DVD players, i.e., commercially available players, different stampers are used for producing data on the first and second substrates 302 and 306, respectively (to account for the back-to-back bonding of the two substrates).

Specifically, to produce the different stampers, data are recorded differently on respective glass masters corresponding to the first and second substrates 302 and 306. For example, if the data on the first substrate 302 is recorded using standard spiral mastering, the data on the second substrate 306 will be recorded using reverse spiral mastering as known to one skilled in the art. With reverse spiral mastering, data is recorded in an opposite rotational direction (compared to standard spiral mastering), and the pits and lands are also reversed compared to those of the first data layer. After bonding the two substrates (e.g., see FIG. 3D), data on the second data layer will be presented in the same spiral direction as that on the first data layer, thus enabling the data on both layers to be read from the same side by currently available commercial DVD players.

Furthermore, during mastering of data for the first substrate 302, a blank area (or gap) is provided near a transition region, for example, close to location 114 where the first metal-containing layer 210 ends (see FIG. 2). Similarly, during mastering of data for the second substrate 306, a blank area is also provided near the radial position corresponding to location 114. These blank areas for the first data layer and the second data layer preferably overlap with each other to some extent, i.e., along the radial direction, so that no data will be lost during playback of the disc.

To ensure a proper transition between the first layer and the second layer during playback, information is provided in the lead-in area, e.g., table of content in the first layer, to instruct a disc player to switch to a specific portion or sector of the disc (corresponding to a predetermined radial location) for accessing the data in the second layer.

Referring back to FIG. 2, with the metal-containing layers 210 and 220 having different compositions and partially overlapping areal extents, the resulting disc exhibits a visual appearance, when viewed from the read side of the disc, which is quite different from those of conventional optical discs.

Figure 4:
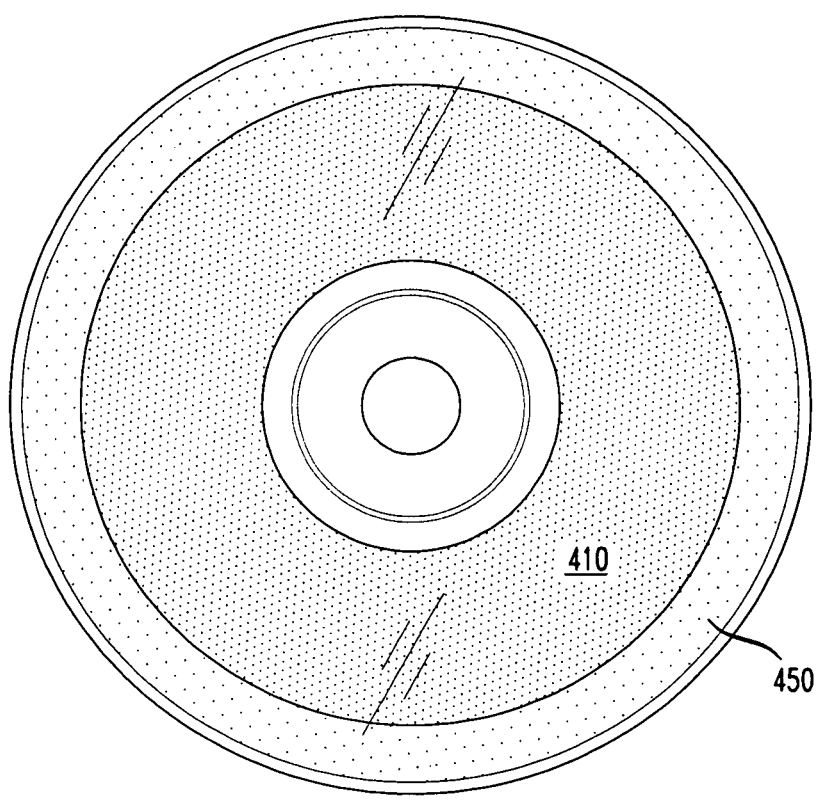
FIG. 4 is a schematic depiction of an image of an optical disc made in accordance with one embodiment of the present principles.

This is illustrated in FIG. 4, which is a schematic depiction of an image of a disc 400 with the first metal-containing layer 210 spanning from a radius of about 36.5 mm to about 49.0 mm, and the second metal-containing layer 220 spanning from a radius of about 22 mm to about 59.5 mm. In one example, the metal-containing layer 210 is copper and the second metal-containing layer 220 is aluminum. As shown in FIG. 4, disc 400 exhibits two visually distinct regions 410 and 450 characterized by different colors or shades (which result from the different optical characteristics of the various material layers in the visible spectrum). The inner annular region 410 corresponds approximately to the overlapping areal extents of metal-containing layers 210 and 220 (see FIG. 2), while outer annular region 450 corresponds to the outer portion of the disc for which the metal-containing layer 210 is absent, i.e., a region defined between outer boundaries 114 and 124.

It is understood that in other embodiments, each of the metal-containing layers 210 and 220 may have inner and outer boundaries different from those cited above, or have different relative positioning or offsets of respective boundaries. These embodiments may include configurations in which the first metal-containing layer 210 has an inner boundary at a radial distance smaller than or equal to that of the inner boundary of the second metal-containing layer 220. If desired, the metal-containing layers may also be configured to provide visually distinct regions when viewed from the top of the disc. It is preferable that the radial or areal extents, as well as compositions of these two metal-containing layers be sufficiently different to provide visually distinct regions that can be used for identification purposes, e.g., to identify legitimate or authentic optical discs.

Referring again to FIG. 2, in one embodiment, the disc 100 is a single-sided disc in which duplicate data is provided on both data layers 210D and 220D. Data is recorded on the first data layer 210 using standard spiral mastering, while reverse spiral mastering is used for recording data on the second data layer 220. The disc is configured as a single-sided, single layer disc, e.g., a DVD-5, except that a first portion of data residing on the disc is read from data layer 210D while a second portion of data is read from data layer 220D. In this case, the various layer thicknesses are provided such that metal-containing layers 210 and 220 are both located within the focusing range of a reading beam (e.g., at about 650 nm), in accordance with established industry standards for a regular DVD-5 (e.g., ECMA-267), such that the disc can be used with a conventional disc player.

Thus, a laser beam from a disc player can access data on metal-containing layer 210 starting from the inner boundary 112 towards the outer boundary 114 of region 120. After the reading beam has reached a region around the outer boundary 114 of metal-containing layer 210, the beam is directed (e.g., via instructions in the lead-in area) to a predetermined location at a radius larger than that of boundary 114. The reading beam then focuses onto the second metal-containing layer 220 and continues reading data towards the outer boundary 124 of layer 220. Due to the high reflectivity of metal-containing layer 210, only the data residing on the portion of data layer 220D at radial distances larger than that of boundary 114 can be accessed. Nonetheless, in order to simplify the disc fabrication process, data layer 220D is provided with the entire duplicate data (as for layer 210D) and without any reduced radius masking for the metallization step. In another embodiment, layers 210D and 220D do not contain exact duplicate data. Instead, a first portion of data is provided only on the first data layer 210D, while for the second data layer 220D, data is provided only in a region of layer 220D that is accessible by the reading beam from the bottom (e.g., at radial distances larger than that of boundary 114). In one example, the first portion of data on layer 210D and the second portion of data on 220D together form the data for a single program.

The combination of different compositions and partially overlapping areal extents of the metal-containing layers can also be adapted to other disc formats with multiple data layers, e.g., DVD-9. However, in order to allow optical access to different data residing on a "subsequent" data layer, i.e., a data layer farther away from the read side, the first metal-containing layer closer to the read side will have to be partially reflective, e.g., gold, silver or silicon. By proper selection of partially overlapping areal extents and different layer compositions and/or thicknesses, it is expected that the resulting disc may also have regions with sufficiently distinct visual appearance that are suitable for identification purposes.

Although DVDs have been used in the above example, this configuration of dual metal layers with partially overlapping areal extents can also be applied to compact discs (CD). More specifically, CDs can be formed by using different types of sputtered metals or alloys to provide two or more reflective layers associated with a single data layer of the CD, with at least two reflective layers having different compositions, e.g., one layer containing a different metal than the other layer.

Figure 5A:
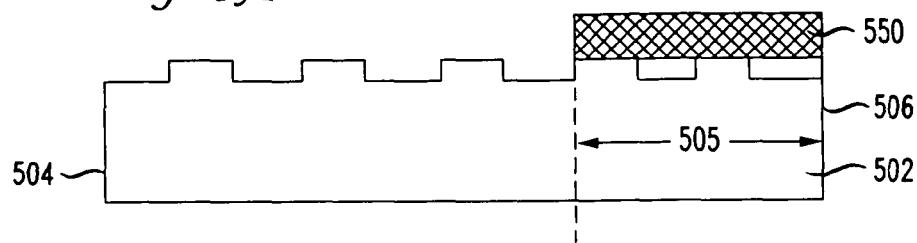
FIGS. 5A-D depict cross-sectional views of a substrate structure during various stages of a disc fabrication process.

FIGS. 5A-D show cross-sectional views of various layers of a substrate structure during the fabrication of a CD according to one embodiment of the present invention. FIG. 5A illustrates a cross-sectional view of a substrate 502 from its inner perimeter 504 (at center hole of disc) to its outer perimeter 506. The substrate 502, which is generally made of polycarbonate or other suitable material, includes pits and lands (representing data) that have been formed using conventional techniques such as injection molding and stamping. A mask 550 is then formed over a portion 505 of the substrate 502, as shown in FIG. 5A.

Figure 5B:
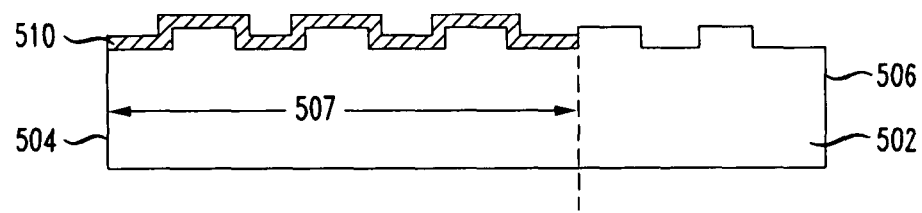

In FIG. 5B, a first metal-containing layer 510 is formed only over the unmasked portion 507 of the substrate 502, e.g., by sputtering a suitable metal onto the structure of FIG. 5A with the mask 550 in place.

Figure 5C:
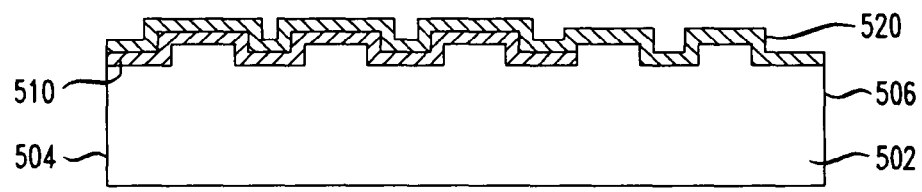

After removing the mask 550, a second metal-containing layer 520, which has a different composition than first metal-containing layer 510, is formed over substantially the entire substrate structure of FIG. 5B using a suitable technique such as sputtering, resulting in a structure such as that in FIG. 5C.

Figure 5D:
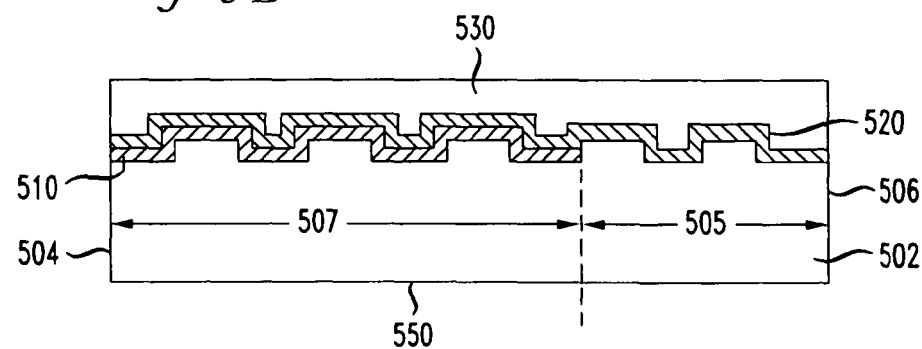

FIG. 5D shows a protective layer 530, e.g., lacquer, formed over the second metal-containing layer 520, followed by printing of a label (not shown), as needed. If desired, one or more additional metal-containing layers (not shown) may also be deposited onto the second metal-containing layer 520 prior to forming the protective layer in order to achieve certain desired visual appearance, e.g., different colors and/or shadings.

In this example, the first metal-containing layer 510 and second metal-containing layer 520 are both associated with a single data layer, i.e., they are used for reading the data provided on the same substrate 502. Data provided in the portion 507 of the substrate is read by reflecting an incident reading beam (entering from the bottom side 550 of substrate 502) off the first metal-containing layer 510, while data provided in the portion 505 of the substrate is read by reflecting the reading beam off the second metal-containing layer 520.

In general, both the first metal-containing layer 510 and the second metal-containing layer 520 should be sufficiently reflective to provide enough light to be detected by a pick-up head. It is preferable that the amount of reflected light at the pick-up head conforms to one or more industry standards, e.g., ECMA-130, applicable to various CD formats such as CD-ROM, among others. In one example, both metal layers are substantially fully reflective, and the CD structure (e.g., combination of substrate and layer compositions, thicknesses and properties) is configured such that at least about 70% of an incident reading beam is reflected back to the pick-up head. The reading beam may, for example, have a wavelength of about 780 nm.

Each metal-containing layer and may contain one or more metals selected from one of copper, aluminum, silver, gold, silicon, nickel, vanadium, copper-aluminum alloy, silver-based alloy, among others.

Figure 6:
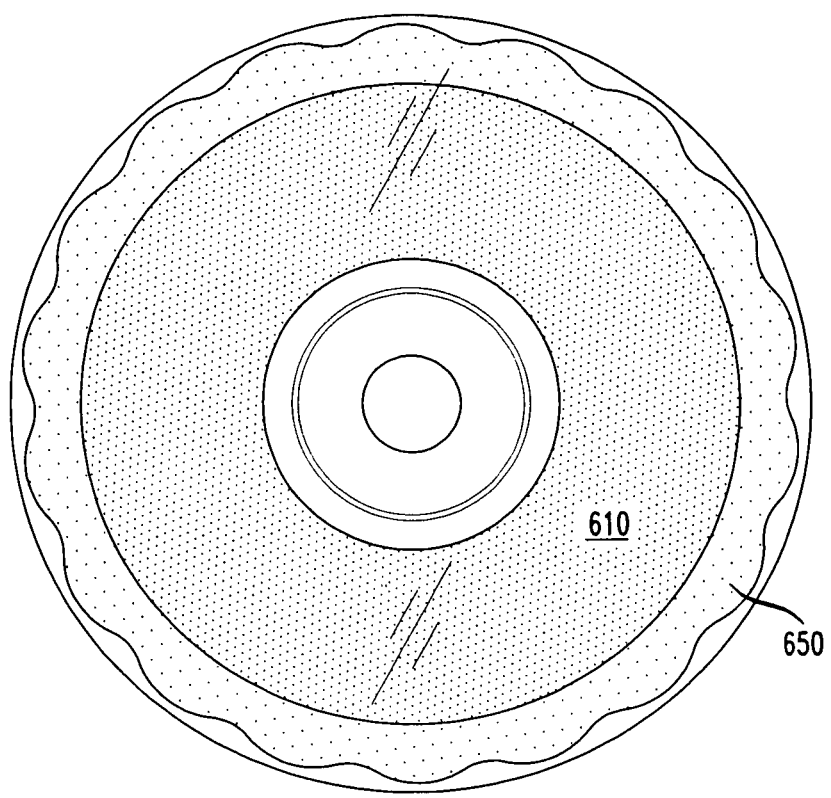
FIG. 6 is a schematic depiction of an image of an optical disc made in accordance with one embodiment of the present principles.

FIG. 6 is a schematic depiction of an image of a CD 600 fabricated with dual metal layers according to one embodiment of the invention. The image is a view of disc 600 from its read side, showing two visually distinct regions 610 and 650. In this example, disc 600 has a first metal-containing layer spanning between a radius of about 18.5 mm to about 44.0 mm (measured from the center of the disc), and a second metal-containing layer spanning between a radius of about 22.5 mm to about 59.5 mm. The first metal-containing layer is a copper/aluminum alloy while the second metal-containing layer is aluminum. As shown in FIG. 6, the substantially annular region 650 has an outer perimeter with a periodic modulated or "wavy" pattern (as opposed to a circular perimeter), which may also be used as an additional identification mark. Such a pattern can be provided by using an appropriate, e.g., customized, mask during metallization. It is understood that the above design and dimension are meant to be illustrative, and that masks with different shapes, designs and/or dimensions may be used during metallization to create customized appearance for the resulting disc.

Although the above examples are presented for single-sided, pre-recorded optical discs, one or more principles discussed herein may also be adapted to double-sided discs, recordable discs with one or more data layers, or hybrid discs with mixed formats. By providing at least two metal-containing layers with different compositions and areal extents in the plane of the disc that partially overlap each other, one can obtain a visual appearance that is different from those of conventional discs, which can be used for visual identification purposes. As mentioned, embodiments of the invention may also be adapted to provide a visual appearance from the "top" side (i.e., label side) that is different from conventional discs. Although it is desirable to provide an optical disc structure, including, for example, various layer thickness and reflectivity, to conform to one or more industry standards to allow for compatibility with existing disc equipment, it is understood that one or more principles of the invention may generally be used to produce optical discs with properties different from those of existing standards.

While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. An optical disc comprising: a first metal-containing layer; a second metal-containing layer; wherein the first metal-containing layer and the second metal-containing layer have different compositions and partially overlapping areal extents in a plane of the disc, wherein at least one of the first and second metal-containing layers is associated with data formed as pits and lands on at least one substrate of the disc.

2. The optical disc of claim 1, wherein the first metal-containing layer and the second metal-containing layer have compositions that differ in at least one metal, the metal being selected from one of copper, aluminum, silver, gold, silicon, nickel and vanadium.

3. The optical disc of claim 1, wherein the first metal-containing layer and the second metal-containing layer are reflective at least one wavelength suitable for reading data stored on the disc.

4. The optical disc of claim 1, wherein at least one non-metallic layer is provided between the first metal-containing layer and the second metal-containing layer, the first metal-containing layer associated with a first data layer, and the second metal-containing layer associated with a second data layer.

5. The optical disc of claim 4, wherein the first data layer and the second data layer contain duplicate data.

6. The optical disc of claim 5, wherein the first metal-containing layer and the second metal-containing layer are reflective at a wavelength of an incident beam to allow reading data on the first and second data layers.

7. The optical disc of claim 6, wherein the data of the first and second data layers are accessed from one side of the disc.

8. The optical disc of claim 1, wherein the first metal-containing layer has an areal extent in the plane of the disc that is smaller than an areal extent of the second metal-containing layer.

9. The optical disc of claim 1, wherein the second metal-containing layer is deposited on the first metal-containing layer, and the first and second metal-containing layers are associated with a single data layer.

10. A method of forming an optical disc, comprising: (a) forming a first metal-containing layer on a portion of a first substrate; (b) forming a second metal-containing layer over the first metal-containing layer; wherein the first metal-containing layer and the second metal-containing layer have different compositions and partially overlapping areal extents in a plane of the first substrate, and wherein at least one of the first and second metal-containing layers is associated with data formed as pits and lands on at least the first substrate.

11. The method of claim 10, wherein step (a) comprises: (a1) providing a mask on the first substrate; (a2) depositing the first metal-containing layer on an unmasked portion of the first substrate; and (a3) removing the mask.

12. The method of claim 10, wherein the first metal-containing layer and the second metal-containing layer each includes a metal selected from one of copper, aluminum, silver, gold, silicon, nickel and vanadium.

13. The method of claim 10, further comprising forming at least one non-metallic layer between the first metal-containing layer and the second metal-containing layer.

14. The method of claim 10, further comprising: forming the second metal-containing layer on a second substrate, and bonding the second metal-containing layer with the second substrate to the first metal-containing layer and the first substrate.

15. The method of claim 14, wherein the first metal-containing layer is associated with data formed on the first substrate, and the second metal-containing layer is associated with data formed on the second substrate.

16. The method of claim 15, wherein data formed on the first substrate and on the second substrate are duplicate data.

17. The method of claim 10, wherein the second metal-containing layer is formed on the first metal-containing layer.

18. The method of claim 17, wherein the first and second metal-containing layers are associated with data formed on the first substrate.

19. The optical disc of claim 1, wherein the different compositions and partially overlapping areal extents of the first and second metal-containing layers result in two visually distinct regions of the disc.

20. The method of claim 10, wherein the different compositions and partially overlapping areal extents of the first and second metal-containing layers result in two visually distinct regions of the disc.

* * * * *